(12) United States Patent
Agekura et al.

(10) Patent No.: US 6,389,827 B2
(45) Date of Patent: May 21, 2002

(54) HEAT SOURCE APPARATUS OF ICE STORAGE TYPE

(75) Inventors: Masanori Agekura; Mitsugu Aoyama; Kenji Takagi; Ken Kaneko; Akira Mishima, all of Shimizu (JP)

(73) Assignee: Hitachi, Ltd., Tokyo (JP); trustee for the benefit of Hitachi Air Conditioning, Co., Ltd.

(*) Notice: Subject to any disclaimer, the term of this patent is extended or adjusted under 35 U.S.C. 154(b) by 0 days.

(21) Appl. No.: 09/750,041

(22) Filed: Dec. 29, 2000

(30) Foreign Application Priority Data

Feb. 14, 2000 (JP) ........................................ 2000-039733

(51) Int. Cl.[7] .............................................. F25D 17/02
(52) U.S. Cl. ........................................... 62/185; 62/231
(58) Field of Search ............................ 62/59, 185, 434, 62/445, 231

(56) References Cited

U.S. PATENT DOCUMENTS

| | | | |
|---|---|---|---|
| 4,940,079 A | * | 7/1990 | Best et al. ...................... 62/59 |
| 5,044,172 A | * | 9/1991 | Inoue et al. .................... 62/335 |
| 5,598,712 A | * | 2/1997 | Watanable et al. .............. 62/59 |
| 5,941,083 A | * | 8/1999 | Sada et al. ....................... 62/185 |
| 5,946,457 A | * | 8/1999 | Nakai et al. ................... 395/112 |
| 6,053,006 A | * | 4/2000 | Kimborn ....................... 62/434 |
| 6,148,632 A | * | 11/2000 | Kishita et al. .............. 62/323.1 |
| 6,253,567 B1 | * | 7/2001 | Imanari et al. ................ 62/434 |

* cited by examiner

Primary Examiner—William E. Tapolcai
Assistant Examiner—Mohammad M Ali
(74) Attorney, Agent, or Firm—Antonelli, Terry, Stout & Kraus, LLP

(57) ABSTRACT

A heat source apparatus of the ice storage type for performing a cold storage operation and an air-conditioning operation utilizing the stored cold, includes a heat source unit, a cold storage tank connected to the heat source unit, a water level sensor for measuring the stored cold amount by detecting the water level in the cold storage tank, and an operation panel having a menu screen for setting the starting and ending time of the cold storage operation and the air-conditioning operation, wherein the setting of the starting and ending time of the air-conditioning operation can be canceled and a predetermined stored cold amount can be set on the operation panel.

7 Claims, 5 Drawing Sheets

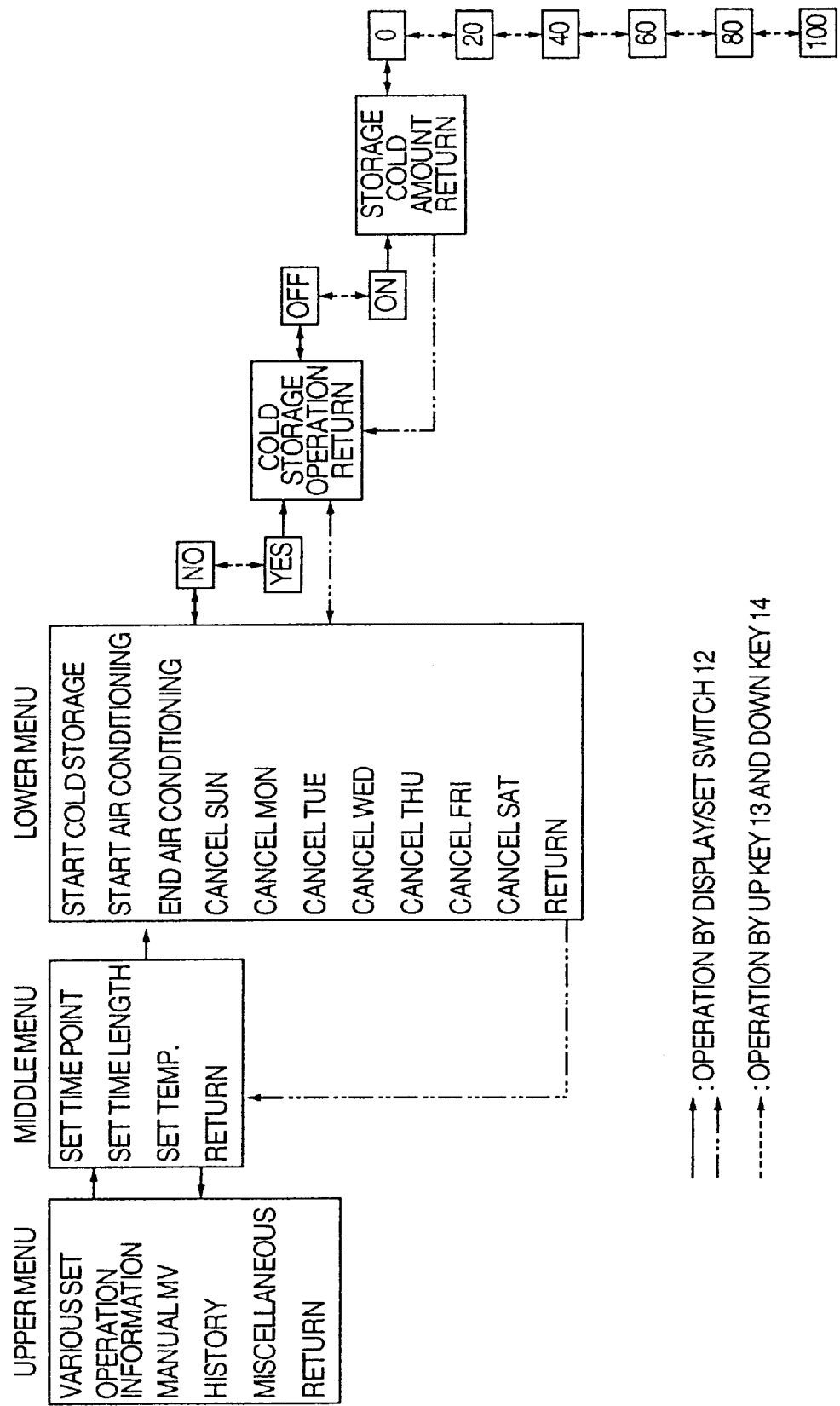

HEAT SOURCE APPARATUS OF ICE STORAGE TYPE

BACKGROUND OF THE INVENTION

The present invention relates to a heat source apparatus of the ice storage type for performing a cold storing operation and the air-conditioning operation utilizing the cold storage, or in particular to a heat source apparatus of the ice storage type having the function of the scheduled operation in which the starting and ending time of the cold storage operation and the starting and ending time of the air-conditioning operation are set for each day.

In the prior art, JP-A-11-132533 discloses a method in which the cold storage operation time is changed at the time of starting the cold storage operation based on the residual cold stored in the heat storage tank in order to eliminate the overage and shortage of the amount of cold stored.

The residual stored cold occurs on a day (a day of the week) when the setting of the starting and ending time of the air-conditioning operation is canceled in the scheduled operation, i.e. on a day when the air-conditioning operation is not performed as scheduled in spite of the cold storage operation performed on the immediately preceding day. In the prior art described above, the apparatus is controlled to limit the cold storage operation time based on the residual stored cold in preparation for the following day in the case where the air-conditioning operation is set for the following day, and therefore the stored cold amount may run short and the load may not be met as required for the air-conditioning operation on the following day.

SUMMARY OF THE INVENTION

The object of the present invention is to solve the problems of the prior art described and above and to provide a user-friendly heat source apparatus of the ice storage type in which even in the case where the air-conditioning operation is canceled for a given day, the shortage of the stored cold amount for the air-conditioning operation on the next day is conveniently prevented while at the same time assuring efficient utilization of the stored by reducing the consumption of extraneous power due to excessive cold storage.

According to the present invention, in order to solve the problem mentioned above, there is provided a heat source apparatus of the ice storage type comprising a heat source unit, a cold storage tank connected to the heat source unit, a water level sensor for measuring the stored cold amount by detecting the water level of the cold storage tank, and an operation panel having a menu screen for setting the starting and ending time of the cold storage operation and the starting and ending time of the air-conditioning operation, wherein the starting and ending time of the air-conditioning operation can be canceled and a predetermined stored cold amount can be set from the operation panel.

Even in the case where the air-conditioning operation is canceled on a given day, a predetermined stored cold amount can be set easily on the operation panel, and therefore the required stored cold amount can be secured for the air-conditioning load for the next day. In this way, the shortage and overage of the stored cold amount can be prevented, and the power consumption can be suppressed to achieve a flexible, economical operation.

According to this invention, the heat source apparatus of the ice storage type described above preferably comprises an operation panel including a liquid crystal display screen, a DISPLAY/SET switching key, and an UP key and a DOWN key for vertically scrolling the menu screen on display.

Also, in the heat source apparatus according to the invention described above, the predetermined stored cold amount that can be set can be preferably selected from among a plurality of stages.

Further, in the heat source apparatus according to the invention described above, whether the cold storage operation is carried out or not can be preferably selected after canceling the setting of the starting and ending time of the air-conditioning operation.

Furthermore, according to this invention, there is provided a heat source apparatus of the ice storage type comprising a heat source unit, a cold storage tank connected to the heat source unit, a water level sensor for measuring the stored cold amount by detecting the water level in the cold storage tank, a means for setting the starting and ending time of the cold storage operation and the starting and ending time of the air-conditioning operation, means for canceling the setting of the starting and ending time of the air-conditioning operation, a means for determining whether the cold storage operation is carried out or not after canceling the setting of the starting and ending time of the air-conditioning operation, and a means for selecting the stored heat amount which is not higher than 100% in a plurality of levels.

In addition, according to this invention, the cold storage operation is desirably carried out until the water level detected by the water level sensor reaches the level at which the cold storage operation is complete.

Moreover, the heat source apparatus according to this invention preferably comprises a means for setting the stored cold amount, wherein the cold storage operation is preferably carried out until the water level detected by the water level sensor reaches a value corresponding to the set stored cold amount.

BRIEF DESCRIPTION OF THE DRAWINGS

FIG. 6 is a diagram showing the specifics of a liquid crystal display screen according to an embodiment of the invention.

DESCRIPTION OF THE EMBODIMENTS

Figure 1:
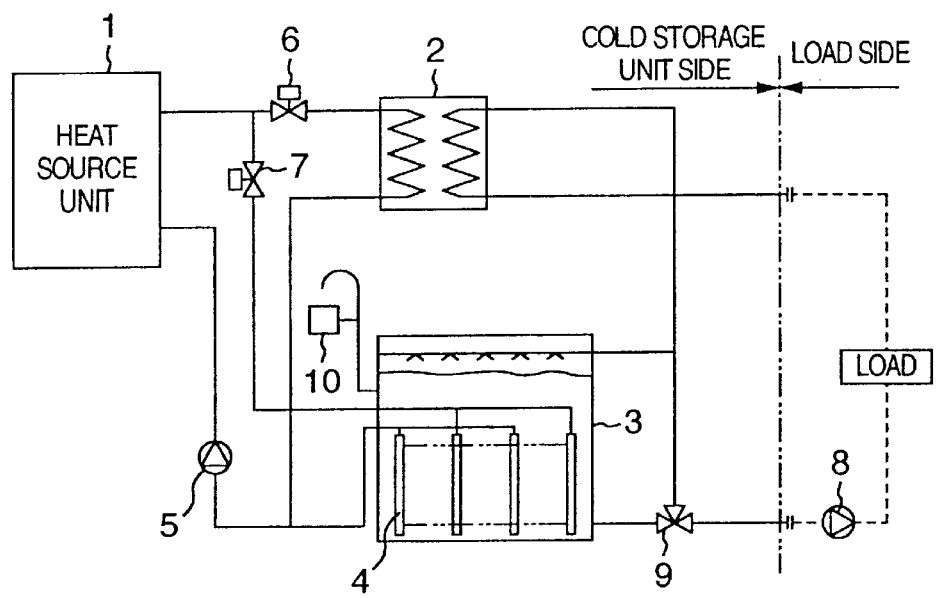
FIG. 1 is a diagram showing a piping system for a heat source apparatus of ice storage type according to an embodiment of the invention.

The present invention will be described in detail below with reference to the drawings. FIG. 1 is a diagram showing a piping system of a refrigeration apparatus of the ice storage type according to an embodiment of the invention.

In the cold storage operation for refrigeration, an electrically-operated two-way valve [A6] is fully closed, an electrically-operated two-way valve [B7] is fully opened, and a brine pump 5 and a heat source unit 1 are operated. Thus, the brine solution supercooled by the heat source unit 1 flows through the pipe in an ice-making heat exchanger 4, exchanges heat with the chilled water stored in the cold storage tank 3 and returns to the heat source unit 1. The cold storage operation is performed by exchanging heat with the chilled water in the cold storage tank 3 and forming ice on the outer surface of the pipe of the ice-making heat exchanger 4 so as to thereby accumulate the stored cold amount.

In accumulating the stored cold amount, the stored cold amount can be controlled by detecting the volume increase due to the phase change from water to ice by a water level sensor 10 arranged in the storage tank 3 and converting it to a cold storage-completing water level. In the cooling air-conditioning operation, on the other hand, the electrically-operated two-way valve [A6] is fully opened, the electrically-operated two-way valve is fully closed, and the chilled water stored in the cold storage tank 3 by the cold storage operation is mixed with the chilled water circulated by a chilled/hot water pump 8 and returned to the load side through a brine/water heat exchanger 2, so that a predetermined amount of the chilled water is supplied to the load side.

Figure 2:
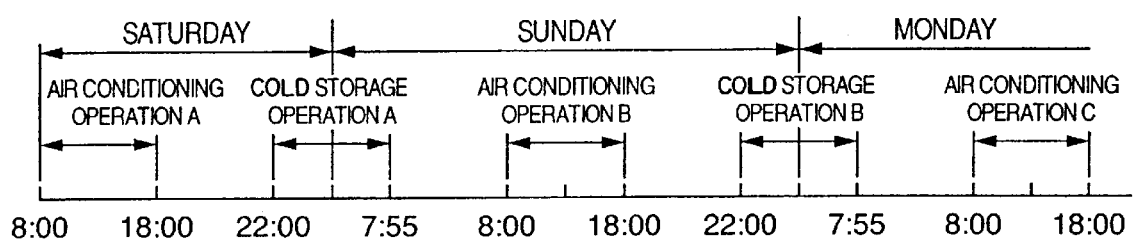
FIG. 2 is a time chart showing an example of the scheduled operation according to an embodiment of the invention.

FIG. 2 shows an example of the scheduled operation, in which the cold storage starting time is set at 22:00, the cold storage ending time is set at 7.55, the air-conditioning starting time is set at 8:00, the air-conditioning ending time is set at 18:00, and the cancelled day, i.e. the day on which the apparatus is not operated, is set to Sunday. According to this schedule, the cold storage operation is not performed from 8:00 to 22:00 on Saturday nor is the air-conditioning operation performed from 8:00 to 18:00 on Sunday.

In the prior art, in the case where the residual stored cold exists at the time of starting the cold storage operation B from 22:00 to 7:55 on Sunday, for example, it is erroneously determined by estimation that the small load for the air-conditioning operation on Sunday would reduce the air-conditioning load on Monday, so that the cold storage operation B is performed by limiting the stored cold amount, with the result that the stored cold amount runs short and cannot meet the load for the air-conditioning operation C from 8:00 to 18:00 on Monday.

According to this embodiment, on the other hand, in the case where the air-conditioning load for Monday can be estimated in advance, the cold storage operation A or B which otherwise would be canceled is made possible, and the amount of cold stored by the cold storage operation A or B is selectively set as one of six stages. As a result, 100% of the stored cold amount can be secured by the air-conditioning operation C from 8:00 to 18:00 on Monday.

Figure 3:
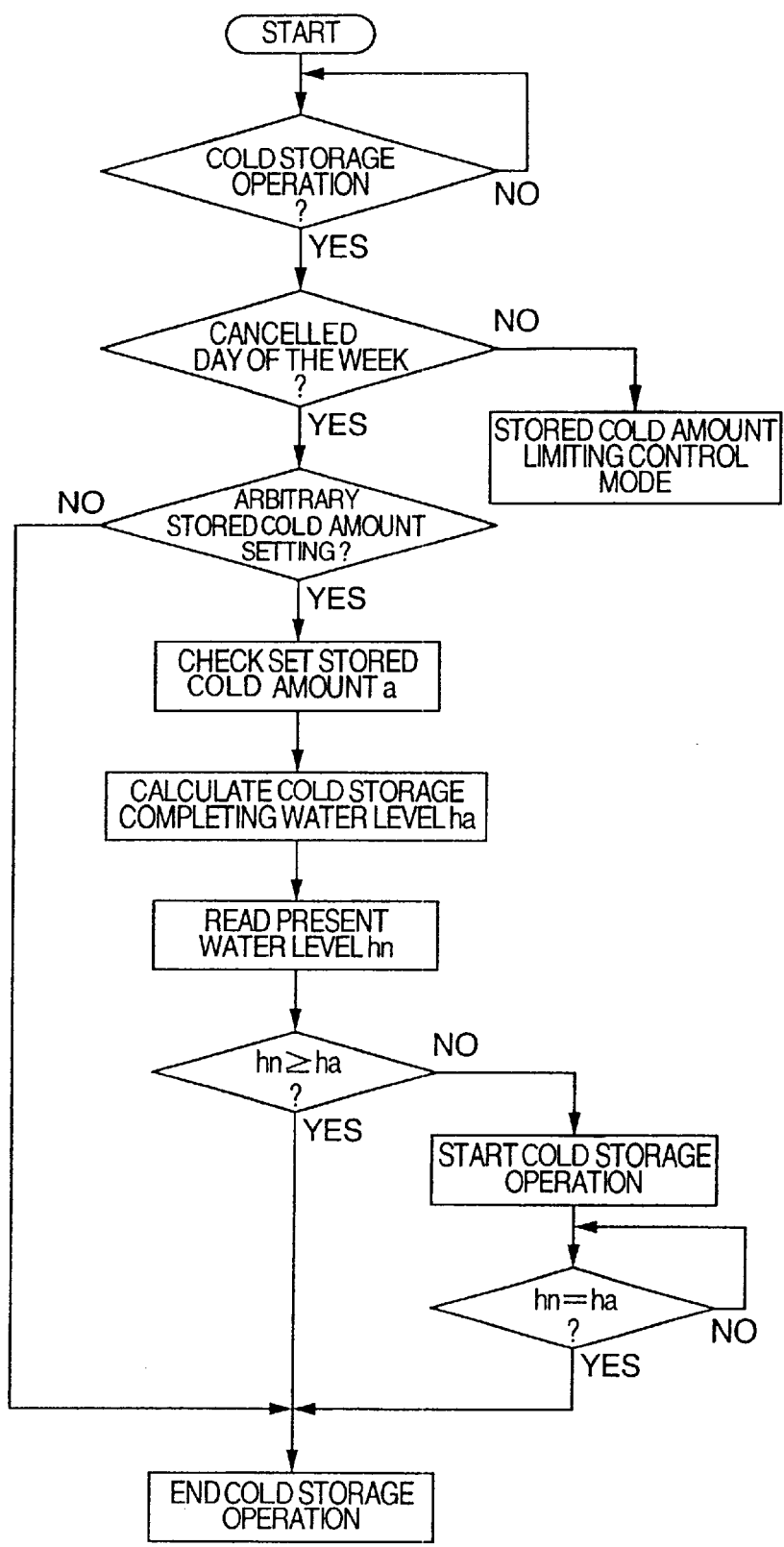
FIG. 3 is a control flowchart according to an embodiment of the invention.

FIG. 3 is a control flowchart according to an embodiment of the invention.

First, whether it is the time to start the cold storage or not is checked, and the in the case where it is the time to start the cold storage, it is determined whether it is a cancelled day of the week or not. In the case where it is a cancelled day of the week, it is determined whether or not the arbitrary stored cold amount setting is selected or not. If the arbitrary stored cold amount setting is selected, the stored cold amount is selected from the six stages and the stored cold amount a is checked. Assuming that the cold storage completing water level with 100% of stored cold amount is h, the cold storage completing water level h for the stored cold amount a is given as ha=h×a.

Then, the present water level hn is measured by the water level sensor 10 and it is determined whether the following condition is met or not.

(Present water level hn)≧(cold storage completing water level ha for stored cold amount a̲)

In the case where this condition is satisfied, the cold storage operation is not carried out, while in the case where this condition fails to be met, the cold storage operation is not carried out to accumulate the set arbitrary amount of cold as indicated by the following equation.

(Present water level hn)=(cold storage completing water level ha for stored cold amount a)

Figure 4:
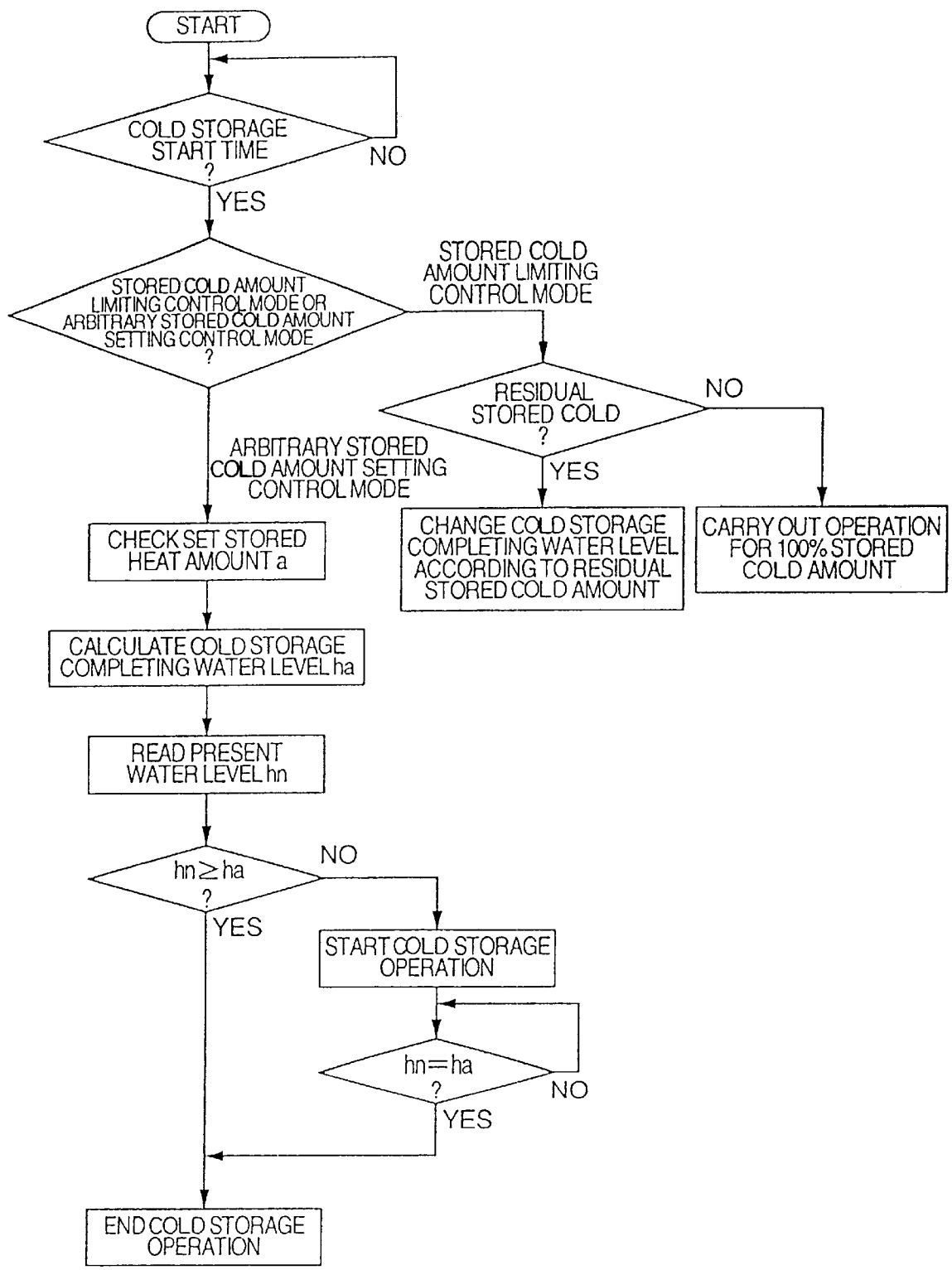
FIG. 4 is a control flowchart according to another embodiment of the invention.

FIG. 4 is a control flowchart according to another embodiment of the invention.

First, it is determined whether the time is to start the cold storage or not, and in the case where the time is to start the cold storage, it is determined which is selected, the stored cold amount limiting control mode or the arbitrary stored cold amount setting control mode. In the case where the arbitrary stored cold amount setting is selected, the set stored cold amount a is checked. Assuming that the cold storage completing water level for the stored cold amount of 100% is h, the cold storage completing water level for the stored cold amount a is given as ha=h×a.

Then, the present water level is measured by the water level sensor 10, and it is determined whether the following condition is met or not.

(Present water level hn)≧(cold storage completing water level ha for stored cold amount a̲)

In the case where this condition is satisfied, the cold storage operation is not carried out, while in the case where this condition fails to be met, the cold storage operation is carried out to accumulate the set arbitrary amount of heat as indicated by the following equation.

(Present water level hn)=(cold storage completion water level ha for stored cold amount a)

In the case where the stored cold amount limiting control mode is selected, on the other hand, the residual stored cold amount is checked. In the case where the residual stored cold exists, the present water level is measured by the water level sensor 10 arranged in the cold storage tank 3 to check the air-conditioning load during the daytime by calculating the present stored cold amount, and the stored cold amount to be accumulated is determined. In the case where there is no residual stored cold, the cold storage operation is carried out for accumulating 100% of the stored cold mount.

According to this embodiment, the stored cold amount limiting control mode is selected for the air-conditioning equipment having the air-conditioning load not undergoing a great daily change, while the stored cold amount corresponding to the load can be secured by selecting the arbitrary stored cold amount setting control mode for the air-conditioning equipment with the daily air-conditioning load thereof known to increase or decrease. Thus, the stored cold amount is prevented from running short to such an extent that the air-conditioning load cannot be met and the air-conditioning operation becomes impossible. Also, it is possible to prevent deterioration of economy which would otherwise be caused by the increased power consumption due to an increased stored cold amount in spite of a small air-conditioning load.

Figure 5:
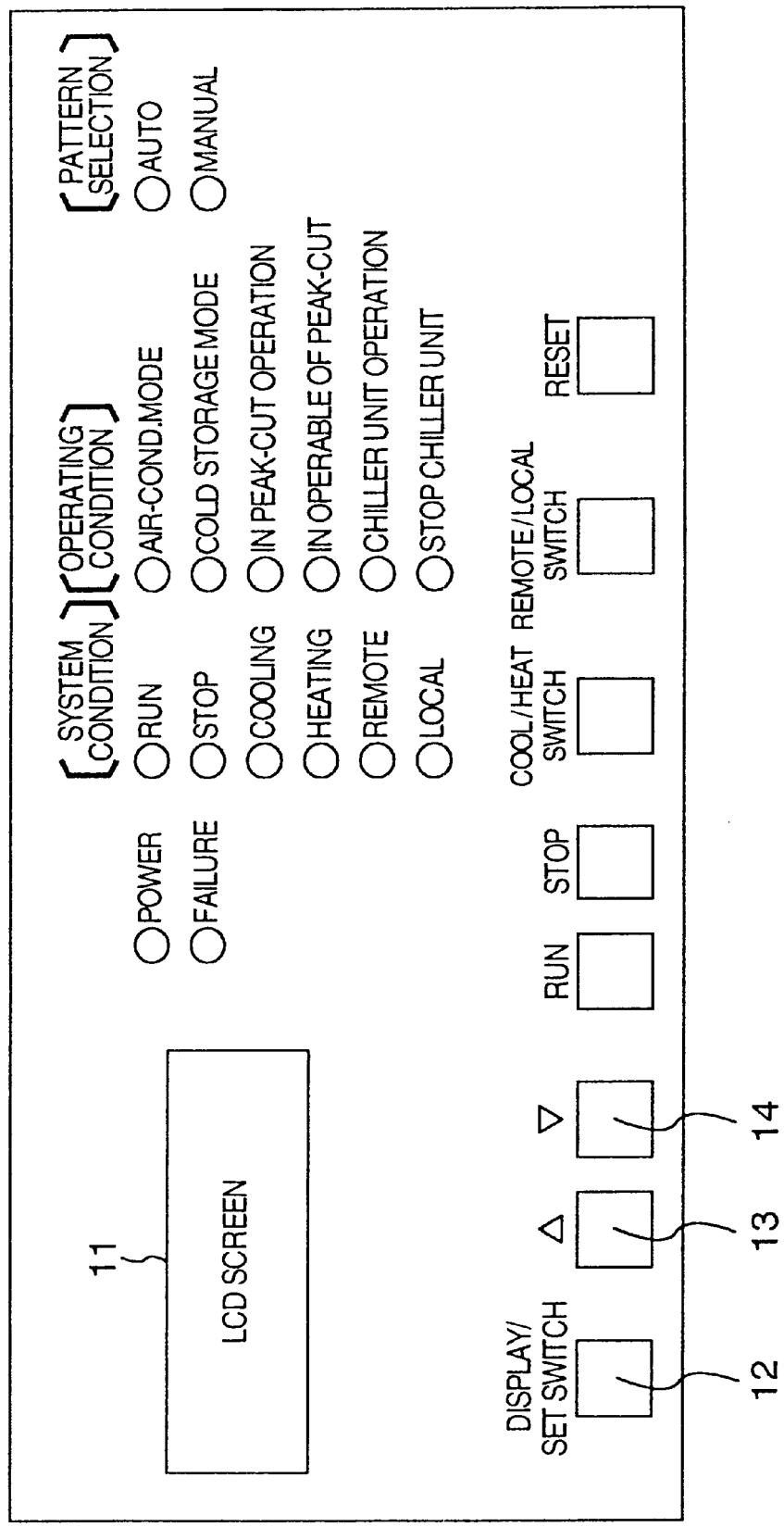
FIG. 5 is a front view showing an operation panel configuration according to an embodiment of the invention.

FIG. 5 shows a configuration of the operation panel according to an embodiment of the invention.

In a liquid crystal display screen 11, the setting screen, the operation information, etc. are classified into a upper menu, a middle menu and a lower menu, which are switched by depressing a DISPLAY/SET switching key 12. Each menu screen can be scrolled up by depressing an UP key 13 and scrolled down by depressing a DOWN key 14.

FIG. 6 shows the specifics of the liquid crystal display screen according to an embodiment of the invention.

The selection and setting of the stored cold amount in six stages will be explained. First, set the cursor to VARIOUS SET from the upper menu, and the DISPLAY/SET switching key 12 is depressed thereby to display the middle menu. From the middle menu thus displayed, the cursor is moved downward by the DOWN key 13, set to SET TIME, and the "DISPLAY/SET" switching key 12 is depressed thereby to display the lower menu. From the lower menu on display, the cursor is set to "CANCEL SUN" by the DOWN key 14 and the DISPLAY/SET switching key 12 is depressed.

An explanation given further about the setting of the cancellation of the cold storage operation and the air-conditioning operation on Sunday. For cancellation, the UP key 13 and the DOWN key 14 are depressed to display "YES", and the DISPLAY/SET switching key 12 is depressed. The "HEAT STORAGE OPERATION" is displayed. Setting the cursor to "COLD STORAGE OPERATION", the DISPLAY/SET key 12 is depressed, followed by depressing the UP key 13 and the DOWN key 14 thereby to display ON. The DISPLAY/SET switching key 12 is depressed thereby to display "STORED COLD AMOUNT", and the DISPLAY/SET switching key 12 is depressed again. Thus, the stored cold amount to be accumulated by the cold storage operation can be selected from the six stages of 0, 20, 40, 60, 80, 100 by depressing the UP key 13 and the DOWN key 14.

In the case where 60 is selected, for example, the stored cold amount accumulated by the cold storage operation on the cancellation day of the week is set to 60%. The setting is now over. To leave the screen, the DOWN key is depressed to set the cursor to RETURN displayed at the lowest position of each menu screen, and the DISPLAY/SET switching key 12 is depressed. The menu screens are sequentially displayed in reverse way.

According to the embodiment described above, the cold storage operation for accumulating the stored cold amount selectively set from the six stages for the set cancellation day of the week is made possible as a scheduled operation. When performing the operation for accumulating the stored cold amount selectively set from the six stages in preparation for the air-conditioning operation for the following day, the stored cold amount can be set in advance in accordance with the load, thereby avoiding the situation in which the air-conditioning operation is impossible due to the shortage of the load for the following day.

Also, the operation for limiting the stored cold amount in accordance with the residual stored cold amount or the operation for storing an arbitrary set amount of cold can be selected for each day regardless whether it is a cancelled day of the week or not in a scheduled operation. In the case where an increase or decrease in the air-conditioning load for the following day can be predicted, it is possible to prevent the air-conditioning operation from failing due to the shortage of the load or the power consumption from being increased by an excessive stored cold amount.

It will thus be understood from the foregoing description that according to this invention, the stored cold amount can be set from the operation panel even for the day for which the air-conditioning operation is canceled, and therefore the required stored cold amount can be easily secured in accordance with the air-conditioning load for the following day. In this way, an insufficient stored cold amount and an excessive stored cold amount can be eliminated, which in turn reduces the power consumption while at the same time making it possible conveniently to use the stored cold efficiently.

What is claimed is:

1. A heat source apparatus of an ice storage type comprising:
    a heat source unit;
    a cold storage tank connected to said heat source unit;
    a water level sensor for measuring a stored cold amount by detecting a water level of said cold storage tank to enable the heat source apparatus to determine if a predetermined cold amount has been stored; and
    an operation panel having a menu screen for setting a starting and ending time of a cold storage operation and a starting and ending time of an air-conditioning operation and for setting the stored cold amount, wherein the setting of said starting and ending time of said air-conditioning operation can be canceled from said operation panel.

2. A heat source apparatus of an ice storage type according to claim 1, wherein said operation panel includes a liquid crystal display screen for displaying said menu screen, a DISPLAY/SET switching key, and an UP key and a DOWN key for scrolling said menu screen upward and downward respectively.

3. A heat source apparatus of an ice storage type according to claim 1, wherein said predetermined stored cold amount can be set from said operation panel and can be selected from a plurality of stages.

4. A heat source apparatus of an ice storage type according to claim 1, wherein whether said cold storage operation is carried out or not can be selected after canceling said setting of the starting and ending time of said air-conditioning operation.

5. A heat source apparatus of an ice storage type for storing cold and heat, comprising:
    a heat source unit;
    a cold storage tank connected to said heat source unit;
    a water level sensor for measuring a stored cold amount by detecting a water level of said cold storage tank to enable the heat source apparatus to determine if a predetermined cold amount has been stored;
    a means for setting a starting and ending time of a cold storage operation and a starting and ending time of an air-conditioning operation;
    a means for canceling the setting of the starting and ending time of said air-conditioning operation; and
    a means for determining whether the cold storage operation is carried out or not after canceling the setting of the starting and ending time of said air-conditioning operation and for selecting the stored cold amount from a plurality of stages which are not higher than 100% of the stored cold amount.

6. A heat source apparatus of an ice storage type according to claim 5, wherein the cold storage operation is continued until the water level detected by said water level sensor reaches a cold storage completing water level.

7. A heat source apparatus of an ice storage type according to claim 5, further comprising a means for permitting the stored cold amount to be set, wherein the cold storage operation is continued until the water level detected by said water level sensor reaches a value corresponding to said set stored cold amount.

* * * * *